United States Patent
Wiesenberg et al.

(10) Patent No.: US 11,679,768 B2
(45) Date of Patent: Jun. 20, 2023

(54) SYSTEMS AND METHODS FOR VEHICLE LANE ESTIMATION

(71) Applicant: TOYOTA MOTOR ENGINEERING & MANUFACTURING NORTH AMERICA, INC., Plano, TX (US)

(72) Inventors: Ryan M. Wiesenberg, Ann Arbor, MI (US); Colin Das, Ann Arbor, MI (US); Matthew Hill, Ann Arbor, MI (US); Emily Lerner, Brighton, MI (US); William Fanelli, Ypsilanti, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 208 days.

(21) Appl. No.: 17/074,043

(22) Filed: Oct. 19, 2020

(65) Prior Publication Data
US 2022/0118976 A1    Apr. 21, 2022

(51) Int. Cl.
*B60W 30/16* (2020.01)
*G06T 7/60* (2017.01)
*G06T 7/70* (2017.01)
*G06T 7/20* (2017.01)
*B60W 30/095* (2012.01)
*G05D 1/02* (2020.01)
*G06V 20/56* (2022.01)

(52) U.S. Cl.
CPC ........ *B60W 30/16* (2013.01); *B60W 30/0956* (2013.01); *G05D 1/0214* (2013.01); *G06T 7/20* (2013.01); *G06T 7/60* (2013.01); *G06T 7/70* (2017.01); *G06V 20/56* (2022.01); *B60W 2420/42* (2013.01); *B60W 2420/52* (2013.01); *B60W 2552/00* (2020.02); *B60W 2554/404* (2020.02); *B60W 2554/80* (2020.02); *G06T 2207/30241* (2013.01); *G06T 2207/30252* (2013.01)

(58) Field of Classification Search
None
See application file for complete search history.

(56) References Cited

U.S. PATENT DOCUMENTS 9,132,837 B2   9/2015   Schlensag et al.
9,530,062 B2   12/2016  Nguyen et al.
(Continued)

FOREIGN PATENT DOCUMENTS

WO    WO 2018/117538 A1    6/2018

*Primary Examiner* — Adam D Tissot
*Assistant Examiner* — Garrett F Evans
(74) *Attorney, Agent, or Firm* — Oblon, McClelland, Maier & Neustadt, L.L.P.

(57) ABSTRACT

Methods, systems, and computer readable mediums for determining a scene representation for a vehicle are provided. A disclosed method includes acquiring data from one or more sensors of the vehicle. The method further includes detecting, using processing circuitry, one or more objects in a surrounding of the vehicle based on the acquired data; determining whether an object of the detected one or more objects intersects with a vehicle lane of travel; determining whether the object is in a lane of travel of the vehicle; determining inter-vehicle gaps and cut-ins between the object and the vehicle; and rendering a scene representation including the inter-vehicle gaps and cut-ins between the object and the vehicle.

19 Claims, 9 Drawing Sheets

(56) References Cited

U.S. PATENT DOCUMENTS

| | | |
|---|---|---|
| 9,664,787 B2 | 5/2017 | Kim |
| 9,934,690 B2 | 4/2018 | Kuroda |
| 2006/0220912 A1 | 10/2006 | Heenan et al. |
| 2009/0067675 A1* | 3/2009 | Tan ........................ G01S 13/931 |
| | | 382/104 |
| 2016/0272199 A1* | 9/2016 | Kawahara ................ G08G 1/04 |
| 2021/0354729 A1* | 11/2021 | Ng .................... B60W 60/0018 |

* cited by examiner

SYSTEMS AND METHODS FOR VEHICLE LANE ESTIMATION

BACKGROUND

Number of lanes on a road and lanes width information are used in many vehicle subsystems such as warning systems and lane keeping assist systems. U.S. Pat. No. 9,132,837 B2 entitled "Method and device for estimating the number of lanes and/or the lane width on a roadway" by Schlensag et al. describes a system for estimating lane width and the number of lanes on a roadway.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for determining a scene representation for a vehicle. The method includes acquiring data from one or more sensors of the vehicle. The method further include detecting, using processing circuitry, one or more objects in a surrounding of the vehicle based on the acquired data; determining whether an object of the detected one or more objects intersects with a vehicle lane of travel; determining inter-vehicle gaps and cut-ins between the object and the vehicle; and rendering a scene representation including the inter-vehicle gaps and cut-ins between the object and the vehicle.

A system for determining a scene representation for a vehicle, the system includes processing circuitry. The processing circuitry is configured to acquire data from one or more sensors of the vehicle, detect one or more objects in a surrounding of the vehicle based on the acquired data, determine whether an object of the detected one or more objects intersects with a vehicle lane of travel, determine inter-vehicle gaps and cut-ins between the object and the vehicle, and render a scene representation including the inter-vehicle gaps and cut-ins between the object and the vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/ dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for determining an object lane membership. The lane membership of the object is determined without the use of map data. Further, the system and associated methodology described herein determine a dynamic representation of a surrounding of the object.

Known techniques for lane estimation require a map to determine the location of vehicles relative to each other. However, in-vehicle maps are expensive to maintain and computationally intensive. The methods described herein estimate the position of the vehicles relative to each other using advanced driver assistance systems (ADAS) sensors without relying on map data. This provides the advantage of estimating lane position with a low computational cost and high accuracy. The methods described herein can be processed online and/or substantially in real-time. Also, at least one of the disclosed methods can be post-processed (i.e., offline), which can improve algorithm results compared to an online system (e.g., by providing more true positives and less false positives).

Figure 1:
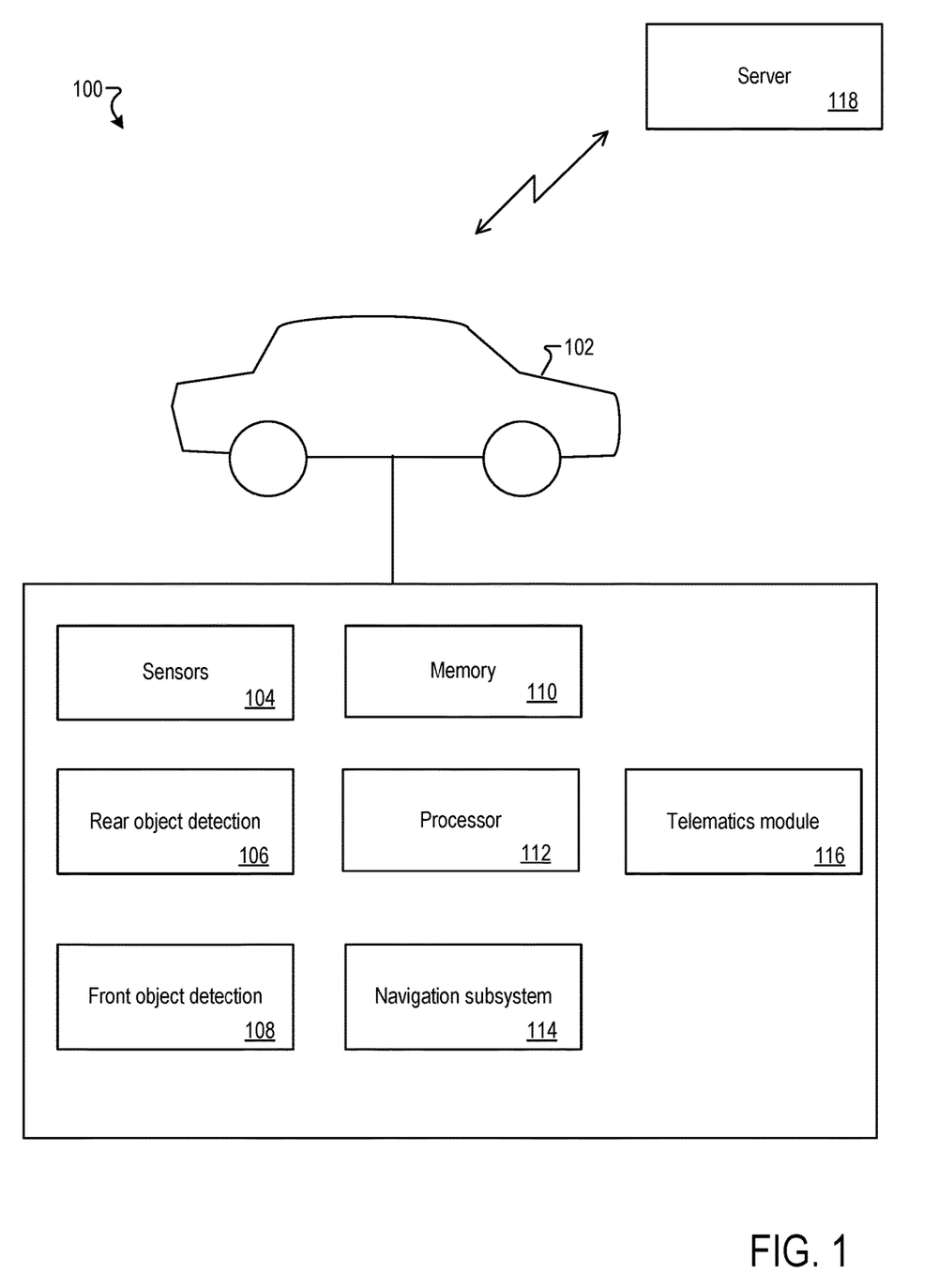
FIG. 1 is a schematic of a system environment according to one example.

FIG. 1 is a schematic of a system environment 100 according to one example. The system 100 may include a vehicle 102, which is sometimes referred to as a primary vehicle 102. The vehicle 102 includes sensors 104, a rear object detection module 106, a front object detection module 108, a memory 110, a processor 112, a navigation subsystem 114 and a telematics module 116. The system may also include a server 118. The vehicle 102 communicates with the server 118 via the telematics module 116.

The vehicle 102 may be any type of vehicle such as a car, truck, bus, or motorcycle. The vehicle 102 may be gas-powered, diesel powered, electric, or solar-powered. The vehicle 102 may be actively operated by a driver or may be partially or completely autonomous or self-driving.

The sensors 104 are one or more sensors 104 configured to collect data from the surrounding of the vehicle 102 as described later herein. The sensors 104 include ADAS sensors. The sensors 104 are connected to various subsystems of the vehicle 102. For example, the sensors 104 may be connected to the rear object detection module 106, the front object detection module 108, and the processor 112 via an internal vehicle network. The internal vehicle network may include one or more of a Controller Area Network (CAN), a Local Internet Network (LIN), a Flexray bus, and a Media Oriented System Transport (MOST) network. The sensors 104 may be any type (e.g., Ultrasonic, sonar) as would be understood by one of ordinary skill in the art. The sensors 104 may be a part of a recognition system of the vehicle 102.

The sensors 104 include radio detection and ranging (RADAR) sensors. RADAR sensors may be positioned on the vehicle 102 such as to cover a desired field of view (e.g., front view, rear view, and surround view). The radio wave radars transmit waves to a predetermined range behind/front the vehicle 102 and receive reflected waves from the object existing in the range. The sensor may be a Doppler radar sensor that determines range rate based on the radar Doppler effect.

The sensors include one or more cameras (e.g., a still camera, a video camera) configured to capture images of the surrounding of the vehicle 102. The one or more cameras may capture the front or rear field of view of the vehicle 102. Then, the processor 112 analyzes the captured images to recognize objects in the front or behind the vehicle 102. The processor 112 may use image recognition techniques such as pattern matching techniques to recognize the objects. Image recognition includes position and/or type of the objects.

The sensors 104 may include one or more laser range finding and light detection and ranging (LIDAR) sensors. The one or more LIDAR sensors use optical remote sensing technology to measure the distance to the target, or other properties of target by illuminating the target with laser light and analyzing the backscattered light.

In some examples, the processor 112 controls the position and/or orientation of the sensors 104 via one or more actuators connected to the sensors 104. For example, the processor 112 may rotate one or more sensors 104 to obtain a full image of the surrounding of the vehicle 102. Further, the processor 112 activates/deactivates one or more sensors based on a distance between the detected object and the vehicle 102. For example, the processor 112 activates a long range radar in response to determining that the camera detected a far object (e.g., more than 2 meters from the center of the vehicle 102).

The rear object detection module 106 is configured to receive data from one or more sensors of the sensors 104. In some examples, the rear object detection module 106 detects an object (sometimes referred to as a detected object) at the rear side of the vehicle 102. The object may be another vehicle such as a moving automobile, a motorcycle, a bicycle, a pedestrian, or a static object.

The front object detection module 108 is configured to receive data from one or more sensors of the sensors 104, similar to the rear object detection module 106. In some examples, the front object detection module 108 detects an object (sometimes referred to as a detected object) in the front side of the vehicle 102 such as a preceding vehicle. Of course, each of the rear object detection module 106 and/or the front object detection module 108 can detect a plurality of such objects.

The memory 110 stores instructions for the processor 112. Further, the memory stores data from the sensors 104. The memory 110 may store vehicle specification such as a width and a length of the vehicle 102. The memory 110 may also store a look-up table that includes predetermined thresholds and lane widths such an average lane width associated with a location of the vehicle 102.

The memory 110 may comprise one or more volatile and/or one or more non-volatile storage components, such as optical, magnetic, and/or organic storage, and the memory 110 may be integrated in whole or in part with the processor 112. The memory 110 may contain instructions (e.g., program logic) executable by the processor 112 to execute various vehicle functions, including any of the functions or methods described herein.

The processor 112 includes processing circuitry. In one implementation, the vehicle 102 may include on-board computer for providing general purpose computing functionality within the vehicle 102. For example, the on-board computer may include the processor 112. The processor 112 may be a part of a controller of the vehicle 102 such as, for example, a single electronic control unit (ECU) or multiple ECUs that may function cooperatively or communicate with each other using a network and/or a bus of the vehicle 102. The processor 112 is configured to accept data from the sensors 104, the rear object detection module 106, and the front object detection module 108, as an input. The processor 112 analyzes the data (i.e., performs an analysis of the data) and/or otherwise processes the data to determine a static and/or a dynamic scene representation for the vehicle 102 including a vehicle lane of travel. The processor 112 may determine whether the detected object(s) is/are in the lane of travel of the vehicle 102 based on the analysis, as will be discussed further below.

In some examples, the processor 112 expands an imaginary line from a center of the detected object (or the vehicle) and towards or in a certain direction (e.g., the direction of travel or a direction opposite to the direction of travel). In particular, the processor 112 may determine whether the imaginary line intersects with, for example, an imaginary horizontal line across the vehicle (or the object) as described further below. That is, in such examples, the processor 112 is configured to (a) detect a particular intersection event in connection with the imaginary line and/or (b) determine a duration of the intersection event, which can indicate to the processor 112 whether an object is in the lane of the travel. In one implementation, the processor expands a line from the center of the vehicle in the direction of travel and/or opposite to the direction of travel (e.g., to monitor a following object or vehicle).

Additionally or alternatively, the processor 112 can expand the line laterally to obtain an imaginary lane, which is sometimes referred to as an expanded lane or estimated lane. Such an expanded lane can facilitate lane membership determinations made by the processor 112 in addition or alternatively to the expanded line, as described further below.

In some examples, a direction of travel in which the imaginary line and/or the imaginary lane is/are expanded can be determined based on a planned travel path (e.g., of the primary vehicle 102 or a detected object). The planned travel path can include, for example, a predetermined path (e.g., determined and/or generated by an autonomous vehicle controller) along which a vehicle (e.g., the primary vehicle 102 shown in FIG. 1) is to travel. In some examples, the processor 112 obtains the planned travel path, for example, from the memory 110 or a different vehicle communicating with the primary vehicle 102. In such examples, the processor 112 determines the direction of travel based on the planned travel path.

The navigation subsystem 114 may include a vehicle lane keep assist subsystem, a vehicle lane departure warning subsystem, and the like as would be understood by one of ordinary skill in the art. The navigation subsystem 114 outputs warnings and/or controls to various vehicle devices (e.g., steering wheel, engine) based on output data received from the processor 112. For example, the navigation subsystem 114 may reduce the speed of the vehicle when a gap factor between the vehicles in the determined scene representation is below a predetermined threshold. The gap factor can be a size (shape), velocity or acceleration of relative spatial movement between the vehicles.

The telematics module 116 may be a direct communication module (DCM) that provides communications over a network to any server that may be included with available services to the vehicle user. The network may be a cellular network. The telematics module 116 may output the scene representation to the server 118.

In one implementation, data from vehicle to vehicle (V2V) communications may be used. The vehicle 102 may output location information of the vehicle 102 to other surroundings vehicles. The vehicle 102 may output the location information to the server 118. The server 118 may determine a visual representation of the vehicles and output the visual representation to the vehicles. In addition, data may be gathered through vehicle-to-everything (V2X) communication, or via Internet of things (IoT) technologies.

In one implementation, data from infrastructure sensors located adjacent to the vehicle 102 may be output to the server 118. Data from the infrastructure sensors may be fused with data collected via vehicle to vehicle communications and the sensors 104 to refine the scene representation.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

While an example manner of implementing the system 100 is illustrated in FIG. 1, one or more of the elements, processes, and/or devices illustrated in FIG. 1 may be combined, divided, rearranged, omitted, eliminated, and/or implemented in any other way. Further, the example system 100 of FIG. 1 may include one or more elements, processes, and/or devices in addition or alternatively to those illustrated in FIG. 1, and/or may include more than one of any of the illustrated elements, processes, and devices. In the example of FIG. 1, the sensors 104, the rear object detection module 106, the front object detection module 108, the memory 110, the processor 112, the navigation subsystem 114, and the telematics module 116 are depicted as part of the vehicle 102. However, in some examples, some or all of the operations of these elements and/or devices 104, 106, 108, 110, 112, 114, 116 may be resident in one or more different vehicles (e.g., via one or more vehicle ECUs), infrastructure, a cloud computing platform (e.g., via the server 118), or a combination thereof.

In one implementation, an anticipated trajectory of two or more vehicles is determined. The processor 112 may determine whether the trajectories are going to intersect. The path of a following vehicle is likely to intersect with a path within a specified width of another vehicle when the vehicle and the other vehicle are in the same lane. In other words, when the trajectories of the two or more vehicle intersect, then the vehicles are in the same lane of travel as illustrated in FIG. 2.

Figure 2:
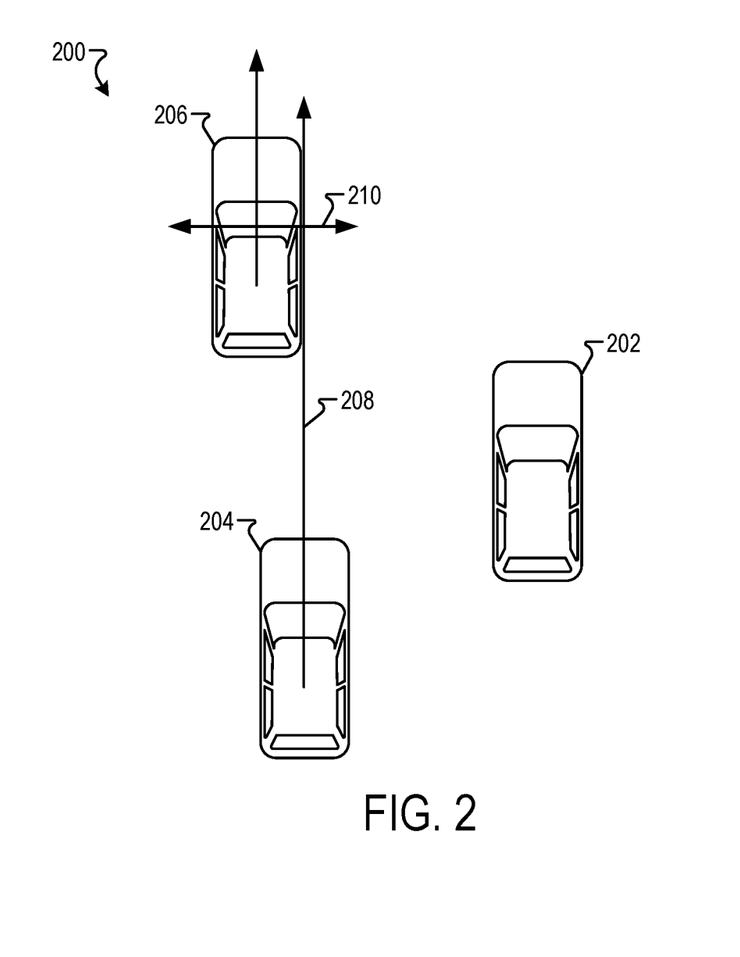
FIG. 2 is a schematic that shows an illustration of an exemplary scenario of lane estimation according to one example.

FIG. 2 is a schematic that shows an illustration 200 of an exemplary scenario according to one example. The illustration 200 shows a first vehicle 202, a second vehicle 204, and a third vehicle 206. The vehicles 202, 204, and 206 of FIG. 2 are traveling in the same direction. The third vehicle 206 may detect the second vehicle 204, for example, via the sensors 104 of the third vehicle 206. In some examples, the processor 112 of the third vehicle 206 determines the trajectory of the second vehicle 204 based on data from the navigation system. Further, the processor 112 expands an imaginary line 208 from a center of the detected object (e.g., the second vehicle 204) towards or in (a) the direction of travel (e.g., if the detected object is behind the third vehicle 206) and/or (b) a direction opposite to the direction of travel (e.g., if the detected object is in front of the third vehicle 206). The imaginary line 208 of FIG. 2 is sometimes referred to as an expanded line. Then, in some examples, the processor 112 expands a lateral line 210 from the center of the detected object in a lateral direction relative to the detected object. The lateral line 210 can be substantially perpendicular relative to the direction of travel, as shown in FIG. 2. The line expansion in the lateral direction may be equal to a predetermined width of an object or a factor thereof, as described further below. That is, the detected object can include a point or point object (e.g., a set of spatial coordinates that is not associated with any dimensions), and the processor 112 can determine one or more dimensions (e.g., any length, width, height, an area, etc.) of the detected object and then associate the dimension(s) with the point. In particular, the processor 112 determines whether one or more intersection events occur in connection with the imaginary line 208. For example, the processor 112 determines whether the imaginary line 208 (or expanded line) and the point object intersect. Further, in another example, the processor 112 determines whether the imaginary line 208 (or expanded line) and the lateral line 210 intersect.

Additionally, in some examples, the one or more sensors 104 of FIG. 1 include at least one sensor (e.g., any of a camera, a LIDAR sensor, a RADAR sensor, a sonar sensor, etc.) configured to generate data indicative of a vehicle size and/or a lane size. In such examples, the processor 112 determines a width of a detected object (e.g., the second vehicle 204) based on the data from the at least one sensor.

The processor 112 can similarly expand the imaginary line 208 from a vehicle in which the processor 112 resides (e.g., the third vehicle 206). For example, in the illustrated example of FIG. 2, the processor 112 can expand the imaginary line 208 from a center of the third vehicle 206 in (a) the direction of travel and/or (b) the direction opposite to the direction of travel. Although FIG. 2 depicts the third vehicle 206 as having the processor 112, in some examples, the processor 112 can be similarly provided in a different vehicle such as, for example, the first vehicle 202 of FIG. 2 or the second vehicle 204 of FIG. 2.

Additionally or alternatively, in some examples, the processor 112 can generate an imaginary lane and/or expand the imaginary lane in one or more directions of interest, which will be discussed further below in connection with FIG. 3. In such examples, similar to the imaginary line 208 shown in FIG. 2, the processor 112 advantageously utilizes the imaginary lane to facilitate determining lane membership.

As described further below, the processor 112 may obtain an instantaneous sample from sensors 104 to detect the object and determine the trajectory of the object. In other embodiments, the sensors may continuously output data to the processor 112. The processor 112 continuously updates the trajectory of the detected objects and the position of the detected objects. For example, the processor 112 may poll the sensors at preset time intervals (e.g., 1 second, 5 seconds, 10 seconds, or the like).

In some examples, the trajectory is a planned travel path, for example, generated by control circuitry (e.g., one or more ECUs). In such examples, the processer 112 is configured to communicate with the control circuitry to obtain the planned travel path from the control circuitry.

The determination of whether an expanded lane (or path) intersects with another object (e.g., a vehicle) may be based on the rear vehicle. For example, the path of a rear vehicle may be expanded forward and in the lateral direction as illustrated in FIG. 3.

Figure 3:
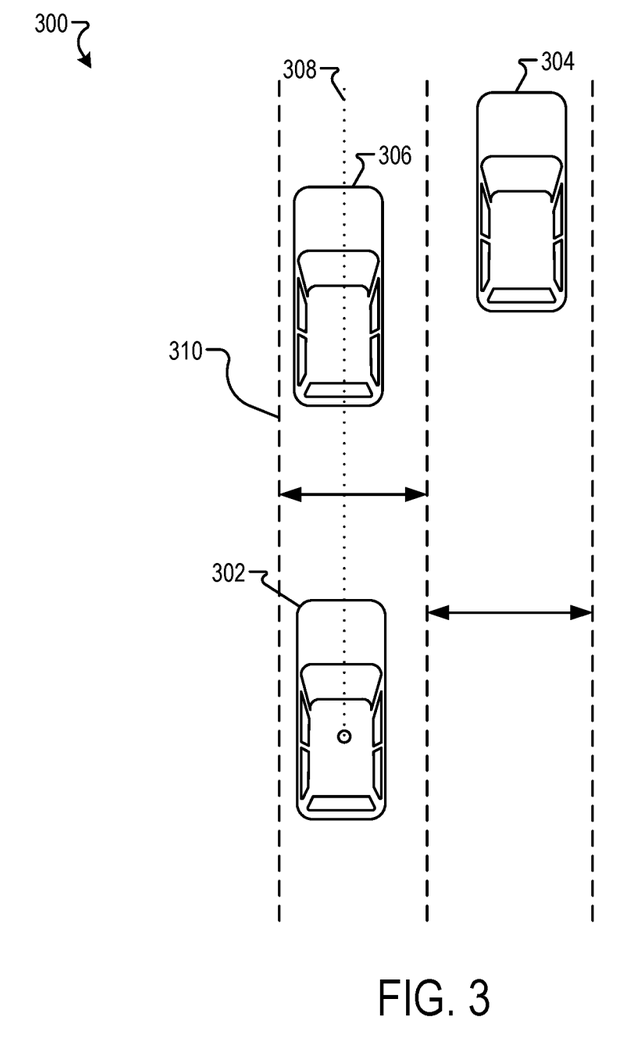
FIG. 3 is a schematic that shows an illustration of an exemplary scenario of lane estimation according to one example.

FIG. 3 is a schematic that shows an illustration of an exemplary scenario of lane estimation according to one example. In the example of FIG. 3, a fourth vehicle 302, a fifth vehicle 304, and a sixth vehicle 306 are traveling in the same direction.

In some examples, the width of the fourth vehicle 302 is expanded forward along the projected trajectory of the vehicle 302. The width of the fourth vehicle 302 may be retrieved by the processor 112 from the memory 110 of the sixth vehicle 306. In one implementation, an average width may be used. For example, the processor 112 of the sixth vehicle 306 may use a predetermined value that corresponds to an average width of available commercial vehicles. To provide the expanded lane, the processor 112 first generates and/or determines a first imaginary line (e.g., line 308 in FIG. 3) that expands from the center of the vehicle 302, for example, towards or in the direction of travel and/or a direction opposite to the direction of travel. Then, the processor 112 expands the first imaginary line in the lateral direction (in the right direction and in the left direction of the first imaginary line) to obtain the expanded lane of travel (e.g., lane 310 in FIG. 3). In some examples, the expansion of the first imaginary line in the lateral direction is equal to a width of the vehicle 302 or a factor (e.g., 1+x) of the width. That is, the width can be expanded by a small tolerance to account for imperfect vehicle motion and/or sensing noise.

The processor 112 of the sixth vehicle 306 determines whether the expanded lane (or path) intersects with another object (e.g., a vehicle). For example, the width of vehicle 302 is projected forward across the projected trajectory 308. Then, the processor 112 determines whether the expanded lane intersects with any object. In FIG. 3, the processor 112 determines that the path intersects with the sixth vehicle 306 but does not intersect with the fifth vehicle 304.

Objects (e.g., vehicles) may have different widths (e.g. a width of a truck vs a width of a motorcycle). In some examples, to account for such width variation, the processor 112 may determine that the object is in a lane when a predetermined area (width and/or length) of the object overlaps with the expanded lane. For example, the processor 112 may determine that the object is in the lane when about 60% of the area of the detected object overlaps with the expanded lane. In another example, the predetermined area of overlap may be 70%. The processor 112 may disregard detected objects that have less than the predetermined area overlapping with the expanded lane. The predetermined area may be updated/adjusted based on data collected. For example, the predetermined area may be adjusted based on false positive or false negative determinations. The processor 112 may collect false positive/negative feedback via input from the driver or passenger of the vehicle. The data collected may also be output to the server 118. The server 118 or the processor 112 may analyze the data collected to determine the predetermined area of overlap that minimize false positive/negative determinations.

Additionally or alternatively, in some examples (e.g., where an imaginary line is utilized by the processor 112), the processor 112 may determine that the object is in the lane based on a target area (e.g., a two-dimensional or three-dimensional geometric figure corresponding to the object, a vehicle, or part thereof) with which the imaginary line can intersect. The target area can be calculated and/or determined based on one or more dimensions of the object or a vehicle in which the processor 112 resides. Referring back to FIG. 2, the processor 112 can obtain such a target area, for example, by sweeping the lateral line 210 of FIG. 2 in a vertical direction (or a direction substantially perpendicular to both the direction of travel and the lateral direction) across a distance corresponding to a certain dimension (e.g., a vehicle height) of the detected object (e.g., the second vehicle 204). In particular, in examples where the imaginary line 208 of FIG. 2 is expanded away from the detected object, the processor 112 may determine that the detected object and the third vehicle 206 are in the same lane if the imaginary line 208 intersects with a first target area of the third vehicle 206 (e.g., a central or center area having a size and a shape). Further, in examples where the imaginary line 208 of FIG. 2 is expanded away from the third vehicle 206, the processor 112 may determine that the detected object and the third vehicle 206 are in the same lane if the imaginary line 208 intersects with a second target area of the detected object (e.g., a central or center area having a size and a shape that can be similar or different relative to the target area of the third vehicle 206). Further, such a target area may be updated/adjusted based on data collected such as, for example, false positive or false negative determinations, similar to the predetermined area described above. For example, the processor 112 may collect false positive/negative feedback via input from the driver or passenger of the vehicle. Further, the data collected may also be output to the server 118. The server 118 or the processor 112 may analyze the data collected to determine a target area of an object or a vehicle that minimizes false positive/negative determinations. Thus, such lanes and/or lines generated by the processor 112 can serve as effective tools for determining lane position.

The width of the lane may be determined from, for example, camera sensor data. The width may also be a predetermined value stored in the memory (e.g., 2.35 meters).

The processor 112 may monitor the position of a detected object over time. Then, the processor 112 may determine a filtered position from multiple readings obtained from the sensors 104. The processor 112 may use the filtered position to determine whether the detected object is in the expanded lane. This approach has the advantage of eliminating noise in the sensed data and prevents false negative/false positive determinations due to noise in the data. In other words, stable objects that appear to be jittering or moving in sensor data are not counted twice and their filtered position is used to determine whether they are in the lane or outside of the lane of interest.

In one implementation, the processor 112 determines that the object is in the lane when the position of the object is in the lane for a predetermined period (time threshold). For example, the processor 112 may determine that the object is in the lane when the position of the object is within the lane for at least the predetermined period (e.g., 5 seconds, 10 seconds, or the like).

The processor 112 may continuously or alternatively, at predetermined periods, obtain updated data to determine an updated path. The processor 112 may sample data or determine the path over a long period in order to determine whether a lane change is happening.

The lane is projected for a predetermined distance in front of the vehicle in order to account for curvature (i.e., the length of the expanded lane in the direction of travel). Objects detected out of the predetermined distance may or may not be in the lane due to potential curvature in the road. The predetermined distance may be 5 meters, 10 meters, 15 meters, 20 meters, 25 meters, 50 meters, 100 meters, or the like. The predetermined distance may be adjusted based on past data such as false positive/false negative determinations. In other implementations, the predetermined distance may be determined in a training phase where map data and actual position of the objects is known. Then, the predetermined distance is stored in the memory 110.

Figure 4:
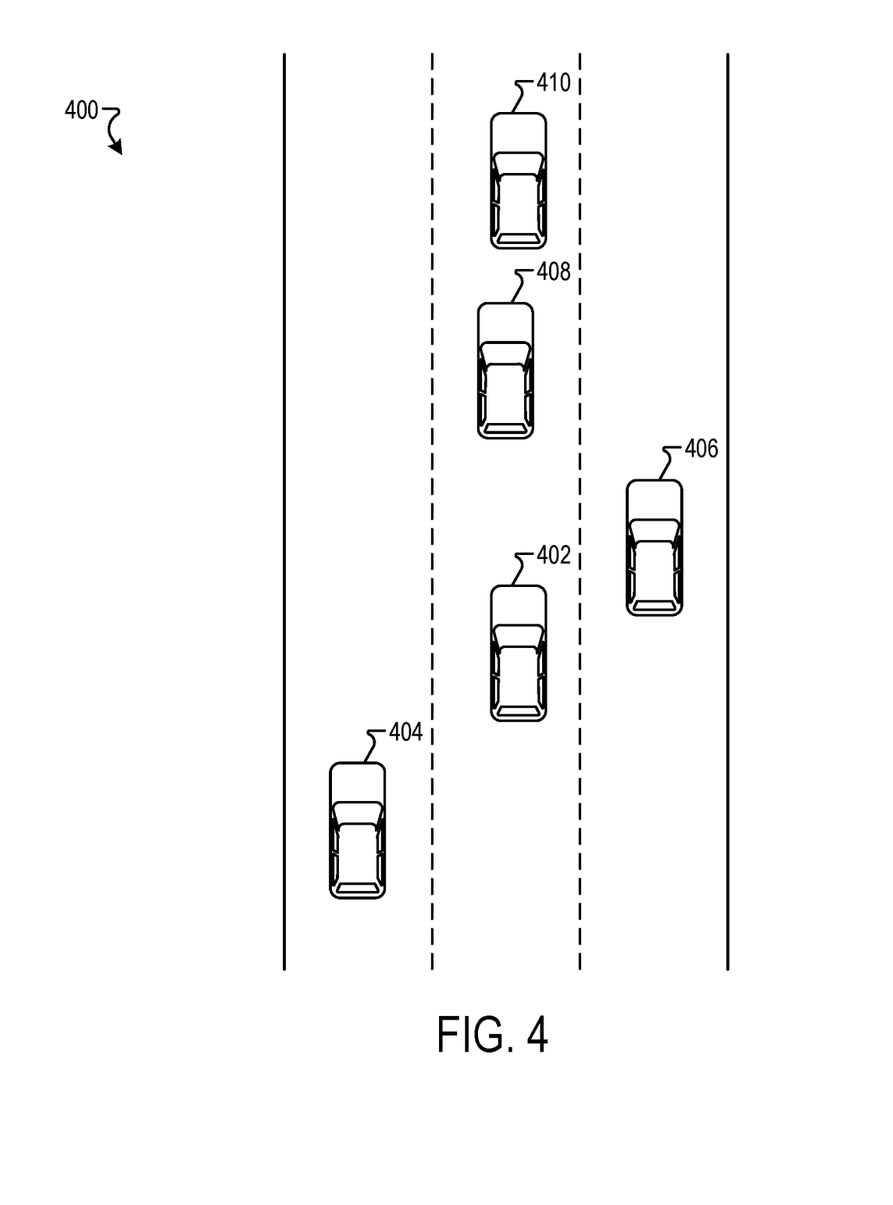
FIG. 4 is a schematic that shows an illustration of a dynamic scene representation according to one example.

FIG. 4 is a schematic that shows an illustration of a dynamic scene representation using techniques described herein. Lanes are estimated over time. The processor 112 determines a location of other vehicles with respect to the vehicle of interest. Then, the processor 112 determines whether the other vehicles are staying in the lane or changing lanes relative to the vehicle of interest.

The processor 112 may determine gap factor(s) between the vehicles based on the collected data. In some examples, the processor 112 determines a gap factor between the vehicle of interest and a following or preceding vehicle. The processor 112 monitors change in gaps (i.e., size of the gap) in addition to merging or lane changes. For example, the processor may identify a gap between a first vehicle and a second vehicle that are in the same lane of travel. Then, the processor 112 may determine how the gap is changing over time. For example, the processor may determine whether the gap is getting smaller (closing), the gap is getting larger (opening), and the rate of change in the gap factor (e.g., accelerating/decelerating). The processor 112 determines whether the gap is suitable for a given application based on the identified information. For example, the processor 112 may determine whether the vehicle can safely change a lane of travel based on the size of the gap and the rate of change.

Gap information may be output to a server and/or a third party (e.g., server 118). Gap information may be used to determine traffic information such as whether traffic volume is high in a given region. Traffic volume may be determined based on the size of the gap information. For example, the processor may determine that the traffic volume is high when an average gap factor is below a first predetermined threshold. The processor may determine that the traffic volume is low when the average gap factor is greater than a second predetermined threshold.

In one example, the gap information may be output to municipalities or other authorities. The gap information may include an average gap factor for a given time, day of the week, and the like. Municipalities may control/change lane available for traffic based on the information. High-occupancy vehicle (HOV) lanes may be converted to regular lane or traveling direction may be switched based on the gap information.

In one implementation, the actual number of lanes may be determined using side cameras placed on the vehicle, GPS information, or via V2X communications.

In one implementation, the processor 112 may determine a comfort level for cut-ins based on the gap factor.

Figure 5:
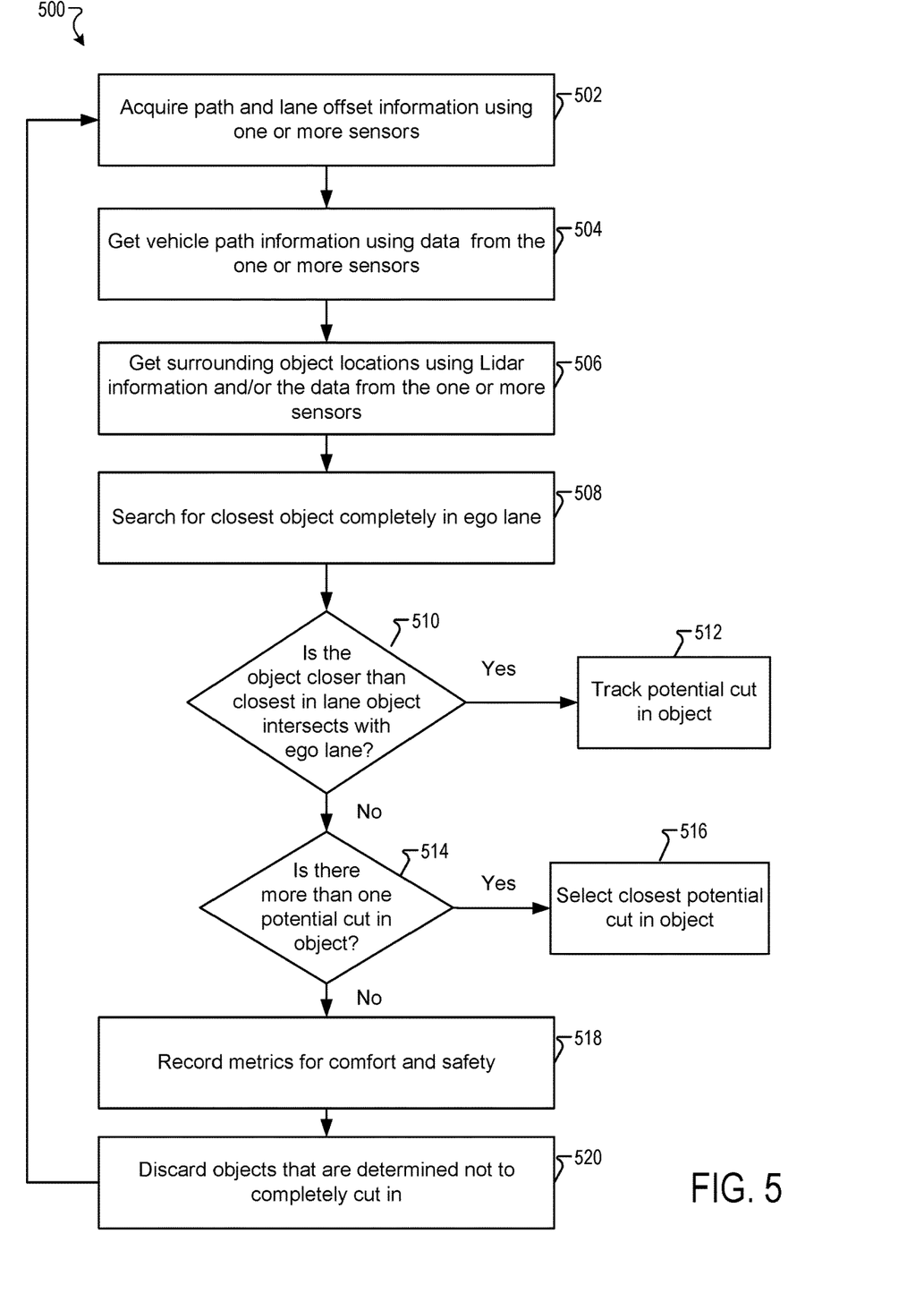
FIG. 5 is a flowchart for a lane estimation process according to one example.

FIG. 5 is a flowchart for a lane estimation process 500 according to one example. The process 500 of FIG. 5 can be implemented using the processor 112 shown in FIG. 1 and, in some examples, any one or more (e.g., all) of the vehicles 102, 202, 204, 206, 302, 304, 306, 402, 404, 406, 408, 410 shown in FIGS. 1-4. At step 502, the processor 112 acquires path and lane offset information using one or more sensors.

At step 504, the processor 112 acquires the vehicle path information for a predetermined distance (e.g., 100 m out). The width of the lane may be determined from one or more cameras. The vehicle path may be a straight line or a forward going line from a center of the vehicle. The processor 112 may obtain the lateral offset from the center of the vehicle to obtain the expanded lane. The offset may be obtained to the right and to the left of the center of the vehicle to form the expanded lane.

At step 506, the processor 112 detects surrounding objects and determines the location of each detected object using LIDAR or other sensor information. The processor 112 overlays the detected objects with the expanded lane.

At step 508, the processor 112 determines whether any of the detected objects is completely within the lane of the vehicle of interest or an ego lane of the vehicle wherein the processor 112 resides.

At step 510, the processor 112 determines whether the detected object is closer than closest in lane object intersects with ego lane. In other words, the processor determines whether there is an object that intersects with the expanded lane and is closer than the preceding vehicle. In response to determining that the detected object is closer, then the process proceeds to step 512. In response to determining that the detected object is not closer than the closest in lane object which intersects with the ego lane, then the process proceeds to step 514. Additionally or alternatively at step 510, the processor 112 determines whether there is an object in an adjacent lane relative to the vehicle wherein the processor 112 resides. In response to determining that the detected object is in the adjacent lane, then the process proceeds to step 512.

At step 512, the processor 112 tracks a potential cut-in object. In other words, if the detected object moves to the ego lane, then the processor 112 determines that it is a cut-in. If the detected object is not determined to overlap a predetermined percentage of the lane, then the object is determined to not have cut-in.

At step 514, the processor 112 determines whether there is more than one potential cut-in object. In response to determining that there is more than one potential cut-in object, the process proceeds to step 516. In response to determining that there is no more than one potential cut-in object, the process proceeds to step 518.

At step 516, the processor 112 identifies the closest potential cut-in object to the vehicle of interest.

At step 518, the processor 112 records metrics for comforts and safety. For example, a minimum cut-in distance can be determined by the processor 112 based on user experience. Further, different distances of cut-in can be tested with users in vehicle. Factors indicating a good user experience can include, for example, a maximum deceleration a user would experience if a vehicle in which the user resides breaks suddenly. Such factors can also include a maximum acceleration a vehicle would need to use to effectively jump or enter into a gap. In other words, relatively high acceleration or deceleration may be undesirable and/or make the user feel uncomfortable. The processor 112 can calculate a related force, for example, using one or more equations, models, and/or algorithms relating to physics.

At step 520, the processor 112 discards objects that do not completely cut-in. Then, the process goes back to step 502.

In one implementation, the processor 112 determines whether a second vehicle is available for V2V communications. In response to determining that a second vehicle is not available, the processor may connect with a secondary system such us a marker recognition subsystem. The marker recognition subsystem may include or control one or more cameras that detect lane makers and output detected data to the keep lane assist subsystem. The marker recognition subsystem may be configured to detect pavement markers. Further, the processor may detect roadside static objects to determine the lane of travel, among other things.

Figure 6:
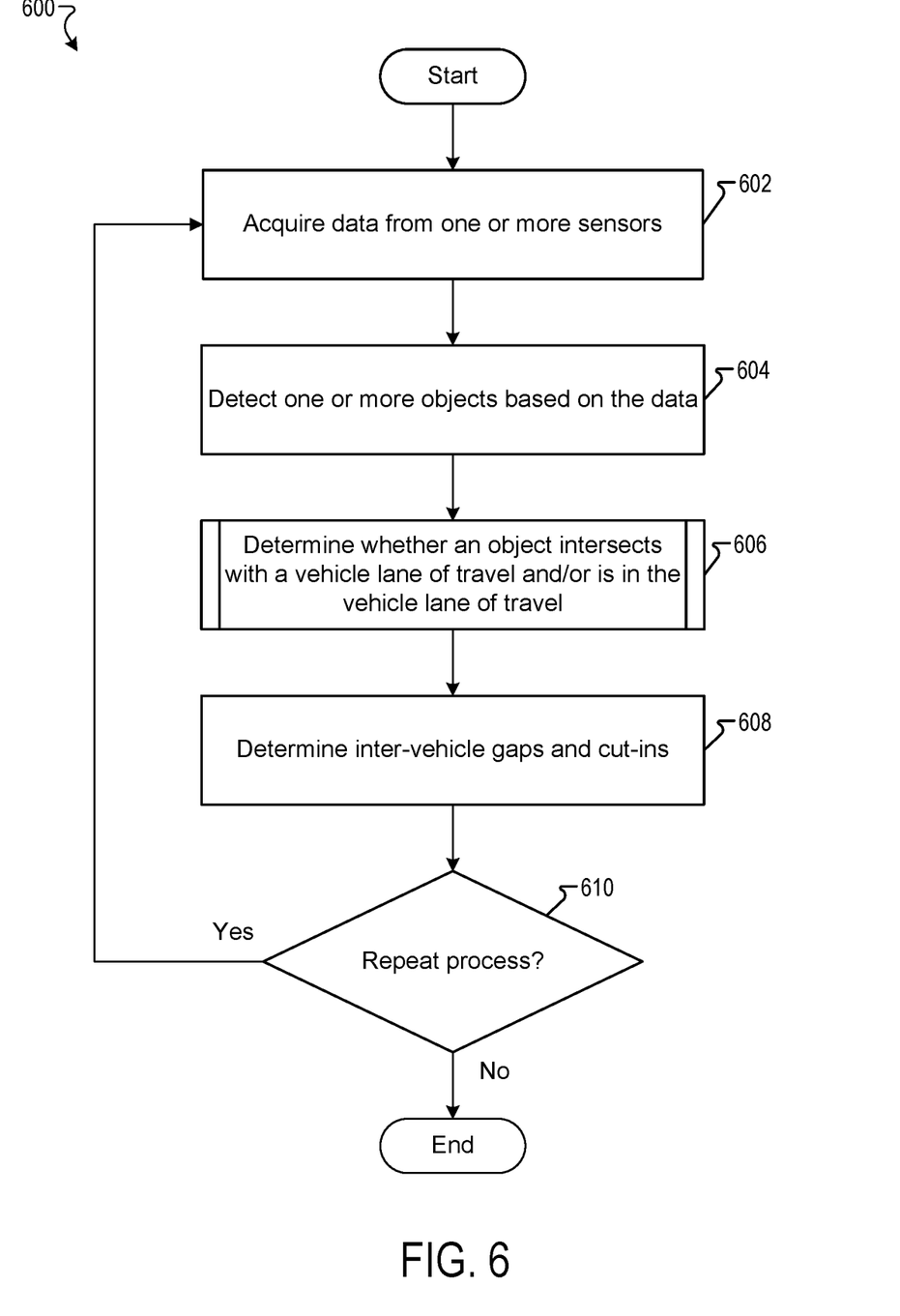
FIGS. 6-8 are flowcharts for lane estimation processes according to other examples.

FIG. 6 is a flowchart for a method 600 for determining vehicle positions according to one example. The method 600 of FIG. 6 can be implemented using the processor 112 shown in FIG. 1 and, in some examples, any one or more (e.g., all) of the vehicles 102, 202, 204, 206, 302, 304, 306, 402, 404, 406, 408, 410 shown in FIGS. 1-4.

At step 602, the processor 112 acquires data from one or more sensors.

At step 604, the processor 112 detects one or more objects based on the data. The processor may fuse data from multiple sensors when data from the multiple sensors is available.

At step 606, the processor 112 determines whether one or more objects intersect with a vehicle lane of travel and/or is in the vehicle lane of travel. For example, the processor 112 determines whether the second vehicle 204 shown in FIG. 2 intersects with the lane of the travel of the third vehicle 206 and/or is in the lane of travel of the third vehicle 206. On the other hand, in another example, the processor 112 similarly determines whether third vehicle 206 shown in FIG. 2 intersects with the lane of travel of the second vehicle 204 and/or is in the lane of travel of the second vehicle 204. To facilitate making such a determination, the processor 112 is configured to generate and utilize one or more imaginary lines (e.g., the line 208 shown in FIG. 2 and/or the line 308 shown in FIG. 3) and/or one or more imaginary lanes (e.g., the lane 310 shown in FIG. 3), as discussed further below in connection with FIGS. 7 and 8.

In one implementation, the processor 112 outputs a warning when one or more objects intersect with the vehicle lane of travel.

At step 608, the processor 112 determines inter-vehicle gaps and cut-ins.

The processor 112 may output lane estimation information to other vehicle sub systems (e.g., navigation sub system).

At step 610, the processor 112 determines whether to repeat the process.

Although the example method 600 is described in connection with the flowchart of FIG. 6, one or more other methods of implementing the example system 100 may alternatively be used. For example, the order of execution of the blocks 602, 604, 606, 608, 610 may be changed, and/or at least some operations of the blocks 602, 604, 606, 608, 610 described may be changed, eliminated, or combined.

Figure 7:
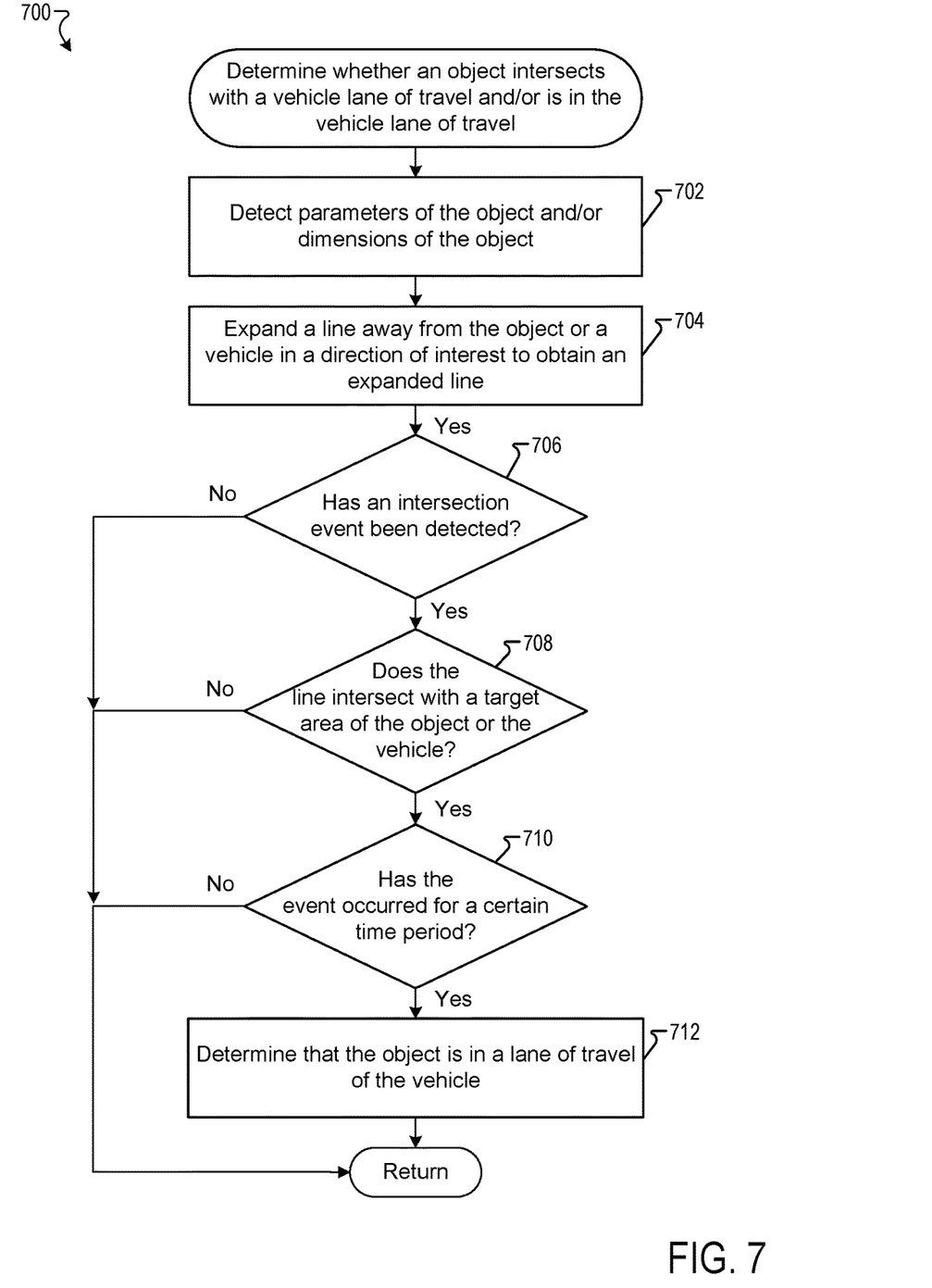

FIG. 7 is a flowchart for a method 700 for determining lane membership of a detected object according to one example. The method 700 of FIG. 7 can be implemented using the processor 112 shown in FIG. 1 and, in some examples, any one or more (e.g., all) of the vehicles 102, 202, 204, 206, 302, 304, 306, 402, 404, 406, 408, 410 shown in FIGS. 1-4. Example operations of blocks 702, 704, 706, 708, 710, 712 can be used to implement block 606 of FIG. 6.

At step 702, the processor 112 detects (e.g., via the sensors 104 or the data thereof) one or more parameters of a detected object and/or one or more dimensions of the detected object. In some examples, the processor 112 determines a position of the second vehicle 204 shown in FIG. 2 relative to the third vehicle 206. Further, the processor 112 can determine, for example, any one or more (e.g., all) a velocity of the second vehicle 204, an acceleration of the second vehicle 204, a deceleration of the second vehicle 204, etc. any other suitable object parameter(s), or a combination thereof. Additionally or alternatively, in some examples, the processor 112 determines one or more dimensions (e.g., any of a length, a width, a height, an area, etc.) of the second vehicle 204. In one example, the processor 112 determines one or more target areas such as, for example, any one or more (e.g., all) of the first target area of the third vehicle 206, the second target area of the second vehicle 204, etc. As previously described, the second vehicle 206 (i.e., a detected object) can include a point. As such, at step 702, the processor 112 can also associate the determined dimension(s) with the point. As previously described, the one or more sensors 104 can include at least one sensor configured to generate data indicative of a vehicle size and/or a lane size. Accordingly, in some examples at step 702, the processor 112 determines a width of the second vehicle 206 based on the data from the at least one sensor.

At step 704, the processor 112 expands a line away from the object or a vehicle in a direction of interest to obtain an expanded line. In some examples, the processor 112 expands the line 208 shown in FIG. 2 from the center of the second or third vehicle 204, 206 in the direction of travel and/or opposite to the direction of travel, as previously described. The processor 112 can obtain the direction of travel, for example, from a planned travel path (e.g., generated by an autonomous vehicle controller) of the second or third vehicle 204, 206.

At step 706, the processor 112 determines whether an intersection event has been detected. In some examples, the intersection event corresponds to the expanded line 208 shown in FIG. 2 intersecting with one of the objects detected at step 604 of FIG. 6. In such examples, in response to the processor 112 determining that expanded line 208 intersects with the second or third vehicle 204, 206, the process proceeds to step 708. On the other hand, in response to determining that the expanded line 208 does not intersect with the second or third vehicle 204, 206, the process returns to a calling function such as the example method 600 of FIG. 6.

At step 708, the processor 112 determines whether the expanded line intersects with a target area of the object or the vehicle. In some examples, in response to the processor 112 determining that the expanded line 208 shown in FIG. 2 intersects with the target area of the second or third vehicle 204, 206, the process proceeds to step 710. On the other hand, in response to determining that the expanded line 208 shown in FIG. 2 does not intersect with a target area, the process returns to a calling function such as the example method 600 of FIG. 6.

At step 710, the processor 112 determines whether the event has occurred for a certain time period. In some examples, the processor 112 determines a time period corresponding to the expanded line 208 intersecting with the target area of the second or third vehicle 204, 206. In such examples, in response to the processor 112 determining that the time period exceeds a predetermined threshold, the process proceeds to step 712. On the other hand, in response to the processor 112 determining that the event failed to occur for a the time period, the process returns to a calling function such as the example method 600 of FIG. 6.

At step 712, the processor 112 determines that the object is in a lane of travel of the vehicle. That is, in some examples, the processor 112 determines that the second vehicle 204 is in the lane of travel of the third vehicle 206 (e.g., when the time period exceeds the predetermined threshold).

Although the example method 700 is described in connection with the flowchart of FIG. 7, one or more other methods of implementing the example system 100 may alternatively be used. For example, the order of execution of the blocks 702, 704, 706, 708, 710, 712 may be changed, and/or at least some operations of the blocks 702, 704, 706, 708, 710, 712 described may be changed, eliminated, or combined.

Figure 8:
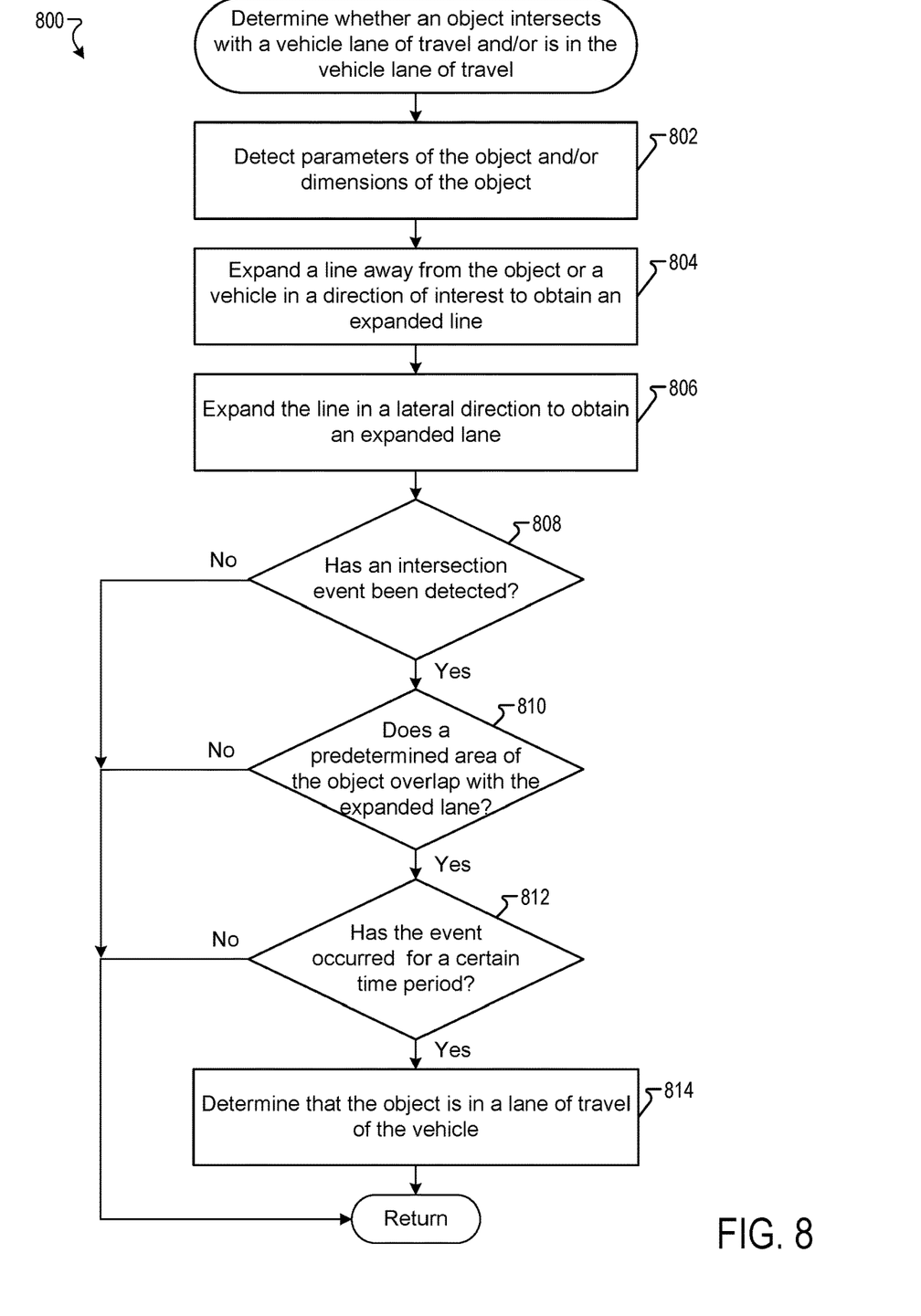

FIG. 8 is a flowchart for a method 800 for determining lane membership of a detected object according to one example. The method 800 of FIG. 8 can be implemented using the processor 112 shown in FIG. 1 and, in some examples, any one or more (e.g., all) of the vehicles 102, 202, 204, 206, 302, 304, 306, 402, 404, 406, 408, 410 shown in FIGS. 1-4. Example operations of blocks 802, 804, 806, 808, 810, 812, 814 can be used to implement block 606 of FIG. 6.

At step 802, the processor 112 detects (e.g., via the sensors 104 or the data thereof) one or more parameters of a detected object and/or one or more dimensions of the detected object, similar to step 702 of FIG. 7.

At step 804, the processor 112 expands a line away from the object or a vehicle in a direction of interest to obtain an expanded line. In some examples, the processor 112 expands the line 308 shown in FIG. 3 from the center of the fourth or sixth vehicle 302, 306 in the direction of travel and/or opposite to the direction of travel, as previously described. Further, the processor 112 can obtain the direction of travel, for example, from a planned travel path of the fourth or sixth vehicle 302, 306.

At step 806, the processor 112 expands the line in a lateral direction to obtain an expanded lane. In some examples, the processor 112 obtains the expanded lane 310 shown in FIG. 3 in such manner, as previously described.

At step 808, the processor 112 determines whether an intersection event has been detected. In some examples, the intersection event corresponds to the expanded lane 310 shown in FIG. 3 intersecting with one of the objects detected at step 604 of FIG. 6. In such examples, in response to the processor 112 determining that the expanded lane 310 intersects with the fourth or sixth vehicle 302, 306, the process proceeds to step 810. On the other hand, in response to the processor 112 determining that the expanded lane 310 does not intersect with the fourth or sixth vehicle 302, 306, the process returns to a calling function such as the example method 600 of FIG. 6.

At step 810, the processor 112 determines whether a predetermined area of the object overlaps with the expanded lane. In some examples, in response to the processor 112 providing a positive determination, the process proceeds to step 812. On the other hand, in response to the processor 112 providing a negative determination, the process returns to a calling function such as the example method 600 of FIG. 6.

At step 812, the processor 112 determines whether the event has occurred for a certain time period. In some examples, the processor 112 determines a time period corresponding to (a) the predetermined area of the object overlapping with the expanded lane 310 and/or (b) the object being in the expanded lane 310. In such examples, in response to the processor 112 determining that the time period exceeds a predetermined threshold, the process proceeds to step 814. On the other hand, in response to the processor 112 determining that the intersection event failed to occur for the time period, the process returns to a calling function such as the example method 600 of FIG. 6.

At step 814, the processor 112 determines that the object is in a lane of travel of the vehicle. That is, in some examples, the processor 112 determines that the fourth vehicle 302 is in the lane of travel of the sixth vehicle 306 (e.g., when the time period exceeds the predetermined threshold).

Although the example method 800 is described in connection with the flowchart of FIG. 8, one or more other methods of implementing the example system 100 may alternatively be used. For example, the order of execution of the blocks 802, 804, 806, 808, 810, 812, 814 may be changed, and/or at least some operations of the blocks 802, 804, 806, 808, 810, 812, 814 described may be changed, eliminated, or combined.

Figure 9:
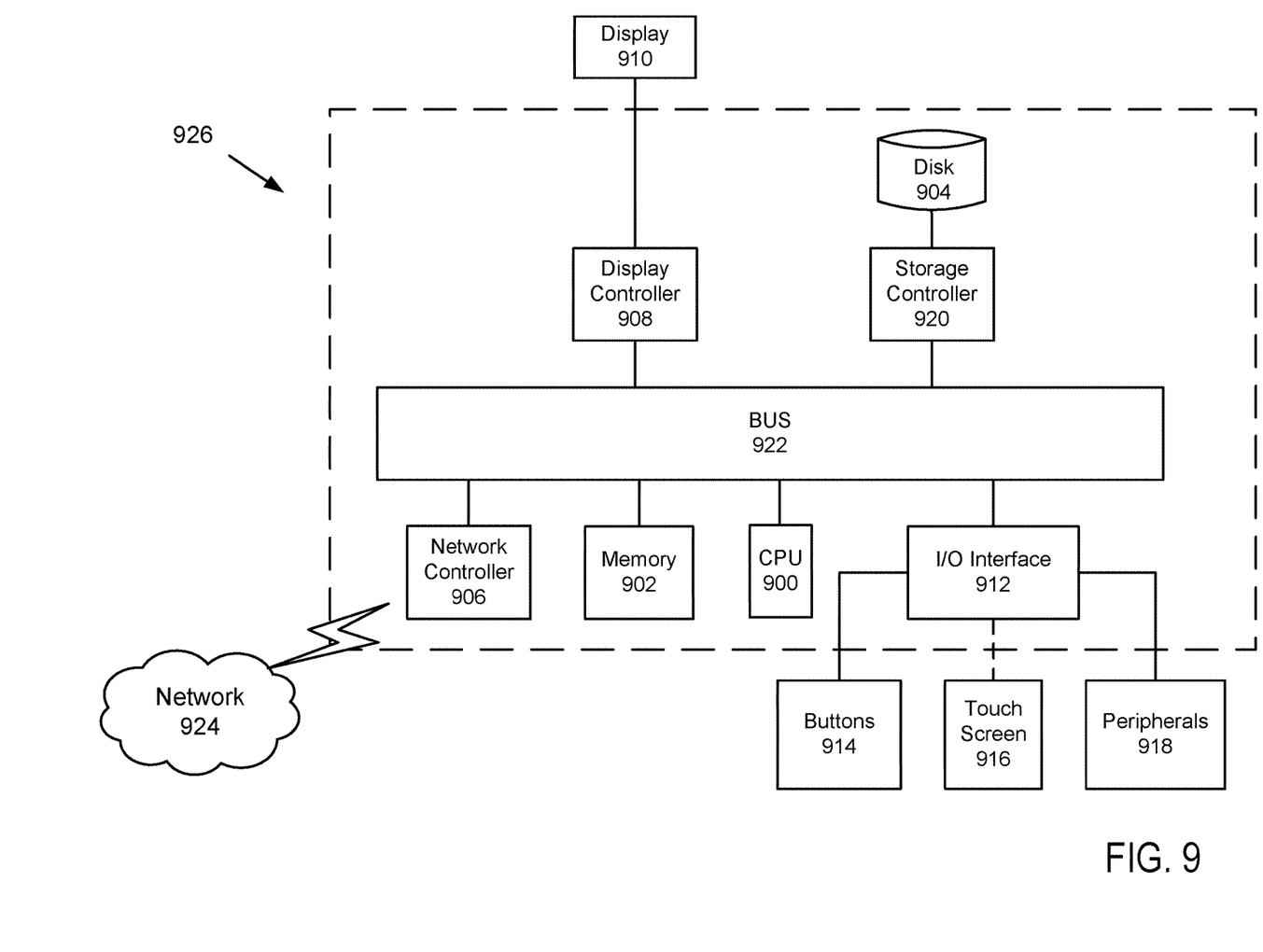
FIG. 9 is a block diagram of a controller according to one example.

In one implementation, the functions and processes of the processor 112 may be implemented by a computer 926 or part thereof. Next, a hardware description of the computer 926 according to exemplary embodiments is described with reference to FIG. 9. In FIG. 9, the computer 926 includes a CPU 900 which performs the processes described herein. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 926 communicates, such as a server or computer.

Further, the claimed advancements may be provided as a utility application, background daemon, or component of an operating system, or combination thereof, executing in conjunction with CPU 900 and an operating system such as Microsoft® Windows®, UNIX®, Oracle® Solaris, LINUX®, Apple macOS® and other systems known to those skilled in the art.

In order to achieve the computer 926, the hardware elements may be realized by various circuitry elements, known to those skilled in the art. For example, CPU 900 may be a Xenon® or Core® processor from Intel Corporation of America or an Opteron® processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computer 926 in FIG. 9 also includes a network controller 906, such as an Intel Ethernet PRO network interface card from Intel Corporation of America, for interfacing with network 924. As can be appreciated, the network 924 can be a public network, such as the Internet, or a private network such as LAN or WAN network, or any combination thereof and can also include PSTN or ISDN sub-networks. The network 924 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 926 further includes a display controller 908, such as a NVIDIA® GeForce® GTX or Quadro® graphics adaptor from NVIDIA Corporation of America for interfacing with display 910. A general purpose I/O interface 912 interfaces with a keyboard and/or mouse 914 as well as an optional touch screen panel 916 on or separate from display 910. General purpose I/O interface also connects to a variety of peripherals 918.

The general purpose storage controller 920 connects the storage medium disk 904 with communication bus 922, which may be an ISA, EISA, VESA, PCI, or similar, for interconnecting all of the components of the computer 926. A description of the general features and functionality of the display 910, keyboard and/or mouse 914, as well as the display controller 908, storage controller 920, network controller 906, and general purpose I/O interface 912 is omitted herein for brevity as these features are known.

The features of the present disclosure provide a multitude of improvements in the technical field of lane estimation and autonomous vehicle. In particular, the systems and methods described herein estimate the position of vehicles without relying on map data. Thus, the systems and methods provide an accurate representation of vehicle surroundings while minimizing computational cost within the vehicle.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for determining a scene representation for a vehicle, the method comprising:
    acquiring data from one or more sensors of the vehicle;
    detecting, using processing circuitry, one or more objects in a surrounding of the vehicle based on the acquired data;
    expanding a line from a center of the vehicle in a direction of travel or a direction opposite to the direction of travel;
    expanding the line by a fixed amount in a lateral direction to obtain an expanded lane;
    determining whether the expanded lane intersects with an object of the detected one or more objects;
    determining that the object is in a vehicle lane of travel in response to determining that the expanded lane intersects with the object
    determining a gap and any cut-ins between the object and the vehicle; and
    rendering a scene representation including the gap and any cut-ins between the object and the vehicle.

2. The method of claim 1, wherein the scene representation is a dynamic scene representation.

3. The method of claim 2, further comprising continuously updating a trajectory associated with the object and the vehicle.

4. The method of claim 3, wherein the trajectory is a planned travel path generated by control circuitry, further comprising obtaining the planned travel path from the control circuitry.

5. The method of claim 1, further comprising:
    expanding a line from a center of the vehicle in a direction of travel of the vehicle or a direction opposite to the direction of travel;
    determining whether the expanded line intersects with the object; and
    determining that the object is in the vehicle lane of travel in response to determining that the expanded line intersects with the object.

6. The method of claim 5, wherein the object includes a point, further comprising determining one or more dimensions associated with the object.

7. The method of claim 6, wherein the one or more sensors include at least one sensor configured to generate data indicative of a vehicle size or a lane size; and wherein the method further comprises determining a width of the object based on the data from the at least one sensor.

8. The method of claim 6, wherein the object is in the lane of travel when the expanded line intersects with a target area of the object.

9. The method of claim 8, further comprising:
    determining a time period corresponding to the expanded line intersecting with the target area; and
    determining that the object is in the vehicle lane of travel when the time period exceeds a predetermined threshold.

10. The method of claim 1, wherein the expansion of the line in the lateral direction is equal to a width of the vehicle or a factor of the width.

11. The method of claim 1, wherein the object is in the lane of travel when at least a predetermined area of the object overlaps with the expanded lane.

12. The method of claim 11, further comprising adjusting the predetermined area based on false positive and false negative determinations.

13. The method of claim 11, further comprising:
determining a time period corresponding to the object being in the expanded lane; and
determining that the object is in the expanded lane when the time period exceeds a predetermined threshold.

14. The method of claim 1, further comprising:
determining a gap factor between the vehicle and the object; and
adjusting a speed of the vehicle based on the gap factor.

15. The method of claim 14, further comprising monitoring a rate of change in the gap factor.

16. The method of claim 1, further comprising:
determining whether the object is in an adjacent lane relative to the vehicle; and
tracking the object as a potential cut-in when the object is in the adjacent lane.

17. The method of claim 1, wherein determining whether the object is in the vehicle lane of travel is a function of a filtered position of the object.

18. A system for determining a scene representation for a vehicle, the system comprising:
processing circuitry configured to
acquire data from one or more sensors of the vehicle,
detect one or more objects in a surrounding of the vehicle based on the acquired data,
expand a line from a center of the vehicle in a direction of travel or a direction opposite to the direction of travel,
expand the line by a fixed amount in a lateral direction to obtain an expanded lane,
determine whether the expanded lane intersects with an object of the detected one or more objects,
determine that the object is in a vehicle lane of travel in response to determining that the expanded lane intersects with the object,
determine a gap and any cut-ins between the object and the vehicle, and
render a scene representation including the gap and any cut-ins between the object and the vehicle.

19. A non-transitory computer readable medium storing computer-readable instructions therein which when executed by a computer cause the computer to perform a method for determining a scene representation for a vehicle, the method comprising:
acquiring data from one or more sensors of the vehicle;
detecting one or more objects in a surrounding of the vehicle based on the acquired data;
expanding a line from a center of the vehicle in a direction of travel or a direction opposite to the direction of travel;
expanding the line by a fixed amount in a lateral direction to obtain an expanded lane;
determining whether the expanded lane intersects with an object of the detected one or more objects;
determining that the object is in a vehicle lane of travel in response to determining that the expanded lane intersects with the object;
determining a gap and any cut-ins between the object and the vehicle; and
rendering a scene representation including the gap and any cut-ins between the object and the vehicle.

* * * * *